US008064753B2

(12) United States Patent
Freeman

(10) Patent No.: US 8,064,753 B2
(45) Date of Patent: Nov. 22, 2011

(54) MULTI-FEATURE MEDIA ARTICLE AND METHOD FOR MANUFACTURE OF SAME

(76) Inventor: Alan D. Freeman, Spanaway, WA (US)

( * ) Notice: Subject to any disclaimer, the term of this patent is extended or adjusted under 35 U.S.C. 154(b) by 9 days.

(21) Appl. No.: 10/379,888

(22) Filed: Mar. 5, 2003

(65) Prior Publication Data

US 2004/0175095 A1    Sep. 9, 2004

(51) Int. Cl.
*H04N 5/92* (2006.01)
(52) U.S. Cl. .......................... 386/338; 386/344
(58) Field of Classification Search ............... 386/95, 386/96, 97, 98, 125, 126; 704/270; 463/1; 434/307 R; 345/173; 707/517
See application file for complete search history.

(56) References Cited

U.S. PATENT DOCUMENTS

| | | | | |
|---|---|---|---|---|
| 3,029,683 | A | * | 4/1962 | Zaromb ........................ 434/309 |
| 5,497,241 | A | * | 3/1996 | Ostrover et al. ................ 386/97 |
| 5,613,909 | A | * | 3/1997 | Stelovsky .......................... 463/1 |
| 5,749,735 | A | * | 5/1998 | Redford et al. ........... 434/307 R |
| 5,870,523 | A | * | 2/1999 | Kikuchi et al. ................ 386/95 |
| 5,914,706 | A | * | 6/1999 | Kono ............................. 345/173 |
| 5,983,236 | A | * | 11/1999 | Yager et al. ................ 707/104.1 |
| 6,632,094 | B1 | * | 10/2003 | Falcon et al. ................. 434/178 |
| 6,633,741 | B1 | * | 10/2003 | Posa et al. ..................... 434/317 |
| 6,778,756 | B1 | * | 8/2004 | Fujimura et al. ............... 386/52 |
| 2002/0165880 | A1 | * | 11/2002 | Hornsby et al. .............. 707/517 |
| 2002/0184189 | A1 | * | 12/2002 | Hay et al. .......................... 707/1 |
| 2004/0015360 | A1 | * | 1/2004 | Calabrese .................... 704/270 |

* cited by examiner

*Primary Examiner* — Huy T Nguyen
(74) *Attorney, Agent, or Firm* — Jensen & Puntigam, P.S.

(57) ABSTRACT

A media member, such as a DVD disc, which includes thereon a combination of visually presented text material, such as a conventional book, an audio narration of the text material which is synchronized with the text material, and a plurality of successively presented visual images which portray various selected scenes described in the text material.

23 Claims, 2 Drawing Sheets

MULTI-FEATURE MEDIA ARTICLE AND METHOD FOR MANUFACTURE OF SAME

TECHNICAL FIELD

This invention relates generally to the publication of books, and more specifically concerns a new entertainment product which combines visually presented text, such as a conventional commercially published book, with other media.

BACKGROUND OF THE INVENTION

Conventional commercially published book manuscripts, for example, between 50,000 and 100,000 words (they can be shorter or larger), in the form of text only, have historically been a successful source of entertainment for many adults and older children. Typically, these books include both fiction of various genres and non-fiction works. However, a significant portion of the population, for various reasons, does not enjoy reading such conventional books for entertainment.

Also, some books, primarily children's books and comic books, including the new action/adventure comics, combine illustrations which correspond to and enhance the text. However, such works tend to be relatively short and in many cases unsophisticated. While in some cases they are engrossing, they do not have the substantial plot and/or character development found in traditional longer works. A large portion of the adult population will not purchase such books for their own use.

Audio books are also known, referred to generally as books on tape, in which the actual text of a book is read by an experienced, skilled reader. Books on tape include many well known commercial books. Books on tape appeal to a rather small portion of the population, and do not involve any illustrations, thus being similar to plain text in that regard. Further, the selection of available books in audio form is quite limited.

In the present invention, several different media are brought together to form a new combined media product, which retains the length and richness of a traditional book. The invention can, however, be used for shorter books as well, including instructional books and similar materials.

SUMMARY OF THE INVENTION

Accordingly, the present invention is a media article, comprising: a media member for play by a user, which includes thereon usually presented text material; an audio narrative of the text material synchronized with the text material as it is presented to the user; and a plurality of successively presented images with which the text material is combined in a sequence, the visual images being related to the text, such as illustration of a scene described in the text, so that the resulting media article comprises a succession of visual images with text thereon and audio narrating the text as it appears.

BEST MODE FOR CARRYING OUT THE INVENTION

The present invention begins with a conventional book, such as for instance a novel, which is comparable to a conventional book manuscript submitted to a commercial publisher. While the present invention has a significant use with works of fiction involving sets of characters and selected story lines or plots, which will vary in detail and complexity, it should be understood that the invention can also be used for other books, including for instance non-fiction books, historical books and biographies. The text is combined with a plurality of visual images, which portray various scenes described in the book, and further with an audio narrative of the text, all on a DVD disc in the preferred form.

The user plays the DVD on a conventional DVD player. The images with the corresponding text appear in sequence on a video screen or monitor, and the audio is synchronized with the text, so that as each portion of text with its indicated image appears on the screen, the audios for that text is heard. Hence, the user "reads" the book on the video screen while seeing the artwork and hearing the audio version, all synchronized together.

Figure 1:
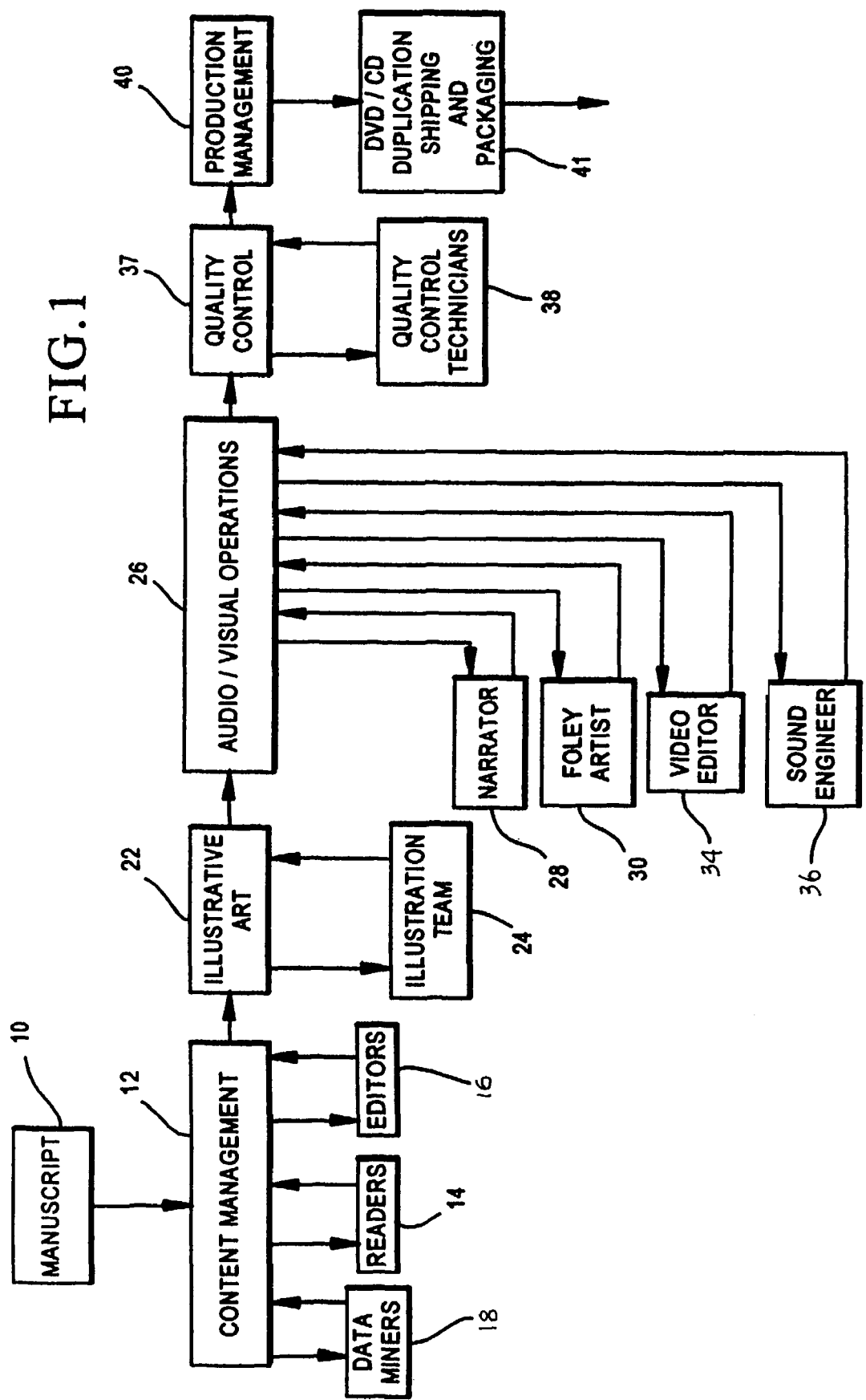
FIG. 1 is a flow chart showing the sequential steps in the manufacture of the new book media product of the present invention.

FIG. 1 shows more specifically the steps in the process for manufacture of the product. The final product combines an actual text of a conventional book, such as a novel, a corresponding audio narrative and associated illustrations on a DVD disc. This is referred to as the "media product" herein.

The process for producing the media product begins with a traditional, i.e. conventional, book manuscript 10, which is submitted by an author. Manuscript 10, as with a conventional publisher, first proceeds through a content management step 12. In this step, the book is first directed to experienced readers, indicated at 14, who determine whether or not the quality of the book is suitable for commercial distribution, in accordance with specific guidelines which are determined by the manufacturer of the media product. Those manuscripts which are approved by readers 14 are then directed to editor (s) 16. An experienced editor will follow typically the same procedure as conventional publishing house editors, checking the text for proper grammar, spelling and sentence structure. Additional changes, both minor or, in some cases, major, are proposed by the editor if deemed necessary or desirable.

After the edited manuscript has been finally approved by the editor, the text is sent to a "data miner", who determines the potential markets for the product, and also determines the advertising/promotional strategies for the media product. The specific markets/strategies in this step will vary, depending upon the particular media product. This particular step, while appropriate for the commercial success of the product, is not necessary in the actual production of the product.

The content-reviewed manuscript is then directed to an artwork (illustration) step 22. Typically, the artwork step 22 will involve a team of people 24 who will create illustrative panels which match up, i.e. illustrate or correspond to, the particular words/scene in the manuscript. The result is generally quite similar to a movie storyboard; the panels, however, are designed and created to maximize the visual experience for the reader. This step is important to the overall entertainment value of the final media product; appropriate skill to accomplish the artwork is, however, readily available, as exemplified by children's books, some of which have extraordinary drawings, as well as the current action/adventure genre of comics, in which illustrations are highly individualized and creative.

Typically, there will be several thousand individual images i.e. illustrative panels for a book of usual length, i.e. 60,000 to 100,000 words. The number of individual images will vary, however, depending upon the particular text work being illustrated. For a work of typical length, at least 1,000 images can be expected.

Commercially, the DVD label will be designed at this point as well, and preliminary advertising, including trailers, will be produced which will be used to promote the book. These displays will be used, for instance, on the internet and in retail displays, among other locations.

Typically, the artist team 24 producing the illustrative panels for the text will utilize one of several commercially available computer software illustration packages, such as Adobe Photoshop®. Accordingly, the software is not disclosed in detail herein. For appropriate illustration detail, the output pixel format for the artwork could be 320×240, superimposed on a 720×480 pixel black background.

The edited text is combined with the artwork produced at step 22 at this point by inserting the text so that it appears directly below the artwork on the visual image or superimposed on a lower portion of the image, with the text being normally 32 points in size, depending upon the font selected and other requirements of the particular artwork.

The artwork may also include actual photographs and/or live video inserts, as long as they relate appropriately to the text. However, it is important that the illustrative panels correspond to and enhance the actual text of the book.

In the next step 26, referred to as audio-visual operations, a copy of the edited manuscript is provided to the audio department, where a professional narrator 28 narrates the entire book. While some books will use only one narrator, other books may use more than one narrator. The completed narrative track is then transferred to a foley artist 30, who has typically previously reviewed the manuscript. The foley artist, in addition to the actual narrative, will add sound effects as desired which either specifically occur in the narrative storyline, such as a doorbell, thunder, etc or which fit the overall mood of the storyline. Hence, the audio portion of the media product can include sound effects in addition to the actual narration of the text. All of this, again, enhances the entertainment value of the media product.

The completed soundtrack is then supplied to a visual editor 34, where the narrative is added and synchronized with the visual text and artwork. Video editing software, such as Adobe Premier®, is used with well-known techniques to merge the audio, the illustrative art and the text onto a timeline format. The merger itself is carried out by commercially available software, using known operator techniques.

The merged material is then balanced for proper visual intensity and appropriate sound levels required for the DVD by a sound engineer 36. The timeline is then exported as an "MPEG2" movie file, which is a known content form which can be transferred conventionally to a DVD disc. The editor can also produce another, separate file which is a soundtrack only, which could be used when only sound playback is appropriate/desired for the user.

The resulting DVD is then processed for quality, shown generally at 37. In quality control, technicians 38 take a sample DVD disc with the completed media product thereon and examine the media product for possible errors in narrative, text and for illustrative continuity. If an error is found, correction is made. In some cases, the DVD product is reviewed several times to ensure the highest quality levels.

The DVD is then sent to production at step 40, in which the DVD and/or the audio CD is duplicated and packaged (41) to fill incoming orders.

Figure 2:
FIG. 2 is a single visual representation illustrating the media concept of the present invention.

A single illustrative panel of the completed media product is shown in FIG. 2. The panel combines text 50 and an illustration 52. The audio narrative is synchronized with the sequence of panels and the specific text thereon. The completed media product will comprise all three elements, as explained above. A typical media product will have several thousand such panels.

The media product can be distributed using broadband satellite and/or cable communication systems. Such systems are capable of keeping track of such distribution. The media product could thus be distributed on a demand basis and then erased once viewing is completed. Other distribution methods/media include video CDs, MP3 audio players, blue laser DVDs for high definition television and virtual reality displays. Other media are also possible.

As noted above, the text manuscript may be a novel or non-fiction work. Typically, the novel can be in a wide variety of genres. The text manuscript can also include shorter stories, as well as other publications, such as training manuals, for instance, for use in situation where text is used for training or education and where illustrations are important. Repair of mechanical devices, for instance, is one application where successive illustrations, long with written text and audio text, could be quite significant and helpful to the user.

Again, as mentioned above, the illustrations should follow the text and enhance the entertainment value of the underlying work. The number of illustrations, however, can vary depending upon the particular text, and the form of the illustrations can vary widely and can include photographs and video sequences. Again, this illustration portion of the media product enhances the overall impact and effect of the text. The narration should also be such as to enhance the entertainment value of the text. Typically, this would be best done by a professional narrator.

Although a preferred embodiment of the invention has been described for purposes of illustration, it should be understood that various changes, modifications and substitutions may be incorporated in the embodiment without departing from the spirit of the invention which is defined by the claims which follow.

What is claimed:

1. A media article, comprising:
a non-transitory media member capable of providing a combined visual and audio activity to a user, the media member being executable and displayable by a separate playback display device, wherein the media member is separable as a unit from the playback display device, wherein the separate playback display device directly and automatically reads and executes the media member, automatically presenting to the user at the separate playback display device, without the use of a microprocessor, the following material pre-synchronized on the media member : visual text material comprising a book or instructional work; an audio narration identical to the text material; and a plurality of successive non-text visual images, wherein the text material is inserted below or superimposed on the non-text visual images and then combined with the audio narration to produce a combined pre-synchronized work on the media member, wherein the text material, audio narration and non-text images are not separate files on the media member but are combined in the pre-synchronized work during manufacture of the media member, wherein the combined work is executed directly by the playback display device, showing to the user synchronized text material, non-text visual images and audio narration, without using a microprocessor to obtain the text material, audio narration and non-text images from separate files on the media member and then synchronizing them for display to the user, wherein the visual text material, the audio narration and the non-text visual images comprise the media member in such a manner that it is unitary, self-contained, non-interactive and unchangeable in content, wherein the relationship between the text material, the non-text visual images and the audio narration is pre-established for the entire media member and cannot be changed by the user during execution of the media member and display of the combined work to the user, and wherein a microprocessor is not required in the playback display device to execute the media member.

2. An article of claim 1, wherein the text material comprises at least 50,000 words.

3. An article of claim 1, wherein the book is a fiction work.

4. An article of claim 1, wherein the book is a non-fiction work.

5. An article of claim 1, further including sound effects which are also related to the text material.

6. An article of claim 1, wherein the visual images directly portray particular scenes described in the text material.

7. An article of claim 1, including at least 1,000 separate visual images.

8. An article of claim 1, wherein the visual images include illustrations.

9. An article of claim 1, wherein the visual images include photographs.

10. An article of claim 1, wherein the visual images include video sequences.

11. An article of claim 1, wherein the audio narration is done with a single narrator.

12. An article of claim 1, wherein the audio narration is done by more than one narrator.

13. An article of claim 1, wherein the media member is a DVD disc.

14. A method of manufacturing a media article, comprising the steps of:
producing a non-transitory media member which is insertable into and removable as a unit from a separate playback display device;
producing on the media member visual text material comprising a book or instructional work, an audio narration identical to the text material synchronized with the text material as the text material is presented to the user during execution of the media member by the separate playback display device, and a plurality of successively presented non-text visual images combined with and pre-synchronized with the text material, wherein the text material is inserted below or superimposed on the non-text visual images and then combined with the audio narration to produce a combined, pre-synchronized work on the media member, wherein the text material, audio narration and non-text images are not separate files on the media member but are combined in the pre-synchronized work during manufacture thereof, so that the display device can directly read and present the pre-synchronized text, audio narration and non-text visual images to a user, without using a microprocessor to obtain the text material, audio narration and non-text visual images from separate files on the media member and then synchronizing them for display to the user, wherein the steps of producing the visually presented text material, audio narration and non-text visual images are carried out in such a manner that the resulting text material, audio narration and non-text visual images are recorded in a pre-synchronized manner on the media member and comprise the entire media member such that it is unitary, self-contained and such that it cannot be modified, altered or interacted with by a user during execution of the media member and display of the combined work to the user, and further such that the media article does not require a microprocessor at the display device to execute the media member.

15. A method of claim 14, wherein the book is a fiction work.

16. A method of claim 14, wherein the book is a non-fiction work.

17. A method of claim 14, further including sound effects which are also related to the text material.

18. A method of claim 14, wherein the visual images directly portray particular scenes described in the text material.

19. A method of claim 14, including at least 1,000 separate visual images.

20. A method of claim 14, wherein the visual images include illustrations.

21. A method of claim 14, wherein the visual images include photographs.

22. A method of claim 14, wherein the visual images include video sequences.

23. A method of claim 14, wherein the media member is a DVD disc.

* * * * *